US012619293B2

(12) United States Patent
Sundararaman et al.

(10) Patent No.: US 12,619,293 B2
(45) Date of Patent: May 5, 2026

(54) POWER MANAGEMENT MESSAGE AGGREGATION

(71) Applicant: QUALCOMM Incorporated, San Diego, CA (US)

(72) Inventors: Ramacharan Sundararaman, San Jose, CA (US); Ravikiran Kaidala Lakshman, Fremont, CA (US); Shrinivas Venkatraman, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 18/618,913

(22) Filed: Mar. 27, 2024

(65) Prior Publication Data

US 2025/0306658 A1 Oct. 2, 2025

(51) Int. Cl.
G06F 1/00 (2006.01)
G06F 1/28 (2006.01)
G06F 11/30 (2006.01)

(52) U.S. Cl.
CPC ..................................... G06F 1/28 (2013.01)

(58) Field of Classification Search
CPC ....................................................... G06F 1/28
See application file for complete search history.

(56) References Cited

U.S. PATENT DOCUMENTS

| | | | | |
|---|---|---|---|---|
| 12,007,915 B1* | 6/2024 | Muskatblit | .......... | G06F 13/1668 |
| 2003/0163649 A1* | 8/2003 | Kapur | ................ | G06F 12/0862 |
| | | | | 711/146 |
| 2009/0113140 A1* | 4/2009 | Quach | ................ | G06F 12/0831 |
| | | | | 711/146 |
| 2010/0268999 A1* | 10/2010 | Morrison | ............... | G11C 29/52 |
| | | | | 711/146 |
| 2011/0302626 A1* | 12/2011 | Kwa | ..................... | G06F 1/3246 |
| | | | | 726/1 |
| 2014/0086040 A1* | 3/2014 | Takahashi | ............... | H04L 45/22 |
| | | | | 370/216 |
| 2017/0337069 A1* | 11/2017 | Huang | ................ | G06F 13/4282 |
| 2019/0042430 A1* | 2/2019 | Sankaran | ............ | G06F 12/0871 |
| 2019/0205224 A1* | 7/2019 | Hamilton | .............. | G06F 11/221 |
| 2023/0077239 A1* | 3/2023 | Schmole | ................ | G06F 13/26 |

* cited by examiner

*Primary Examiner* — Mohammed H Rehman
(74) *Attorney, Agent, or Firm* — Loza & Loza, LLP

(57) ABSTRACT

Aspects relate to mechanisms for an apparatus to aggregate latency tolerance reporting (LTR) messages from a plurality of endpoints to identify a minimum snoop latency and a minimum no-snoop latency across the plurality of endpoints. The minimum snoop latency and minimum no-snoop latency are provided to a processor configured for power management of the apparatus.

21 Claims, 12 Drawing Sheets

100

102 Processor

104 Root Complex

110 PCIe Endpoint

PCIe

108 Memory Subsystem

106 Switch

PCIe

PCIe

PCIe

112_1 PCIe Endpoint

112_2 PCIe Endpoint

112_N PCIe Endpoint

| Root Port | Latest Snoop Latency | Minimum Snoop Latency? | Latest No-Snoop Latency | Minimum No-Snoop Latency? |
|---|---|---|---|---|
| 604 | 606 | 608 | 610 | 612 |
| 1 | a µs | Y | x µs | N |
| 2 | b µs | N | y µs | Y |
| . . . | . . . | . . . | . . . | . . . |
| N | N µs | N | Z µs | N |

602

600

614 — Minimum Snoop Latency Value

616 — Minimum No-Snoop Latency Value

Start

Identify a new snoop/no-snoop latency from an LTR message received from an endpoint ⟋ 802

Compare the new snoop/no-snoop latency to the corresponding minimum snoop/no-snoop latency ⟋ 804

New Lat < Min. Lat ⟋ 806

N

Y

Update the minimum snoop/no-snoop latency ⟋ 808

Transmit updated minimum snoop/no-snoop latency to power management processor ⟋ 810

End

POWER MANAGEMENT MESSAGE AGGREGATION

TECHNICAL FIELD

The technology discussed below relates generally to data communication interfaces, and more particularly, to power management based on latency requirements of devices coupled via data communication interfaces.

INTRODUCTION

High-speed data communication interfaces are frequently used between circuits and components of mobile wireless devices and other complex systems. For example, certain devices may include processing, communications, storage, and/or display devices that interact with one another through one or more high-speed interfaces. Some of these devices, including synchronous dynamic random-access memory (SDRAM), may be capable of providing or consuming data and control information at processor clock rates. Other devices, e.g., display controllers, may use variable amounts of data at relatively low video refresh rates.

The peripheral component interconnect express (PCIe) standard is an example of a high-speed data communication interface that supports a high-speed link capable of transmitting data at multiple gigabits per second. PCIe provides lower latency and higher data transfer rates compared to parallel buses. PCIe is specified for communication between a wide range of different devices. Typically, one device, e.g., a processor or hub, acts as a host, that communicates with multiple devices, referred to as endpoints, through PCIe links. The peripheral devices or components may include graphics adapter cards, network interface cards (NICs), storage accelerator devices, mass storage devices, Input/ Output interfaces, and other high-performance peripherals.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, an apparatus is provided. The apparatus includes a controller coupled to a plurality of endpoints and an aggregator circuit within the controller. The aggregator circuit is configured to receive respective latency tolerance reporting (LTR) messages from one or more of the plurality of endpoints, aggregate the respective LTR messages across the plurality of endpoints to identify a minimum snoop latency and a minimum no-snoop latency, and transmit the minimum snoop latency and the minimum no-snoop latency to a processor configured for power management.

Another example provides a method of power management message aggregation. The method includes receiving respective latency tolerance reporting (LTR) messages from one or more of a plurality of endpoints, aggregating the respective LTR messages across the plurality of endpoints to identify a minimum snoop latency and a minimum no-snoop latency, and transmitting the minimum snoop latency and the minimum no-snoop latency to a processor configured for power management.

Another example provides an apparatus. The apparatus includes means for receiving respective latency tolerance reporting (LTR) messages from one or more of a plurality of endpoints, means for aggregating the respective LTR messages across the plurality of endpoints to identify a minimum snoop latency and a minimum no-snoop latency, and means for transmitting the minimum snoop latency and the minimum no-snoop latency to a processor configured for power management.

Another example provides a computing device. The computing device includes a processor configured for power management and a controller coupled to a plurality of endpoints. The controller is configured to receive respective latency tolerance reporting (LTR) messages from one or more of the plurality of endpoints, aggregate the respective LTR messages across the plurality of endpoints to identify a minimum snoop latency and a minimum no-snoop latency, and transmit the minimum snoop latency and the minimum no-snoop latency to a processor configured for power management.

These and other aspects will become more fully understood upon a review of the detailed description, which follows. Other aspects, features, and examples will become apparent to those of ordinary skill in the art upon reviewing the following description of specific exemplary aspects in conjunction with the accompanying figures. While features may be discussed relative to certain examples and figures below, all examples can include one or more of the features discussed herein. In other words, while one or more examples may be discussed as having certain features, one or more of such features may also be used in accordance with the various examples discussed herein. Similarly, while examples may be discussed below as device, system, or method examples, it should be understood that such examples can be implemented in various devices, systems, and methods.

BRIEF DESCRIPTION OF THE DRAWINGS

FIG. 6 is a diagram illustrating an example of a memory device maintaining LTR information according to some aspects.

DETAILED DESCRIPTION

Figure 1:
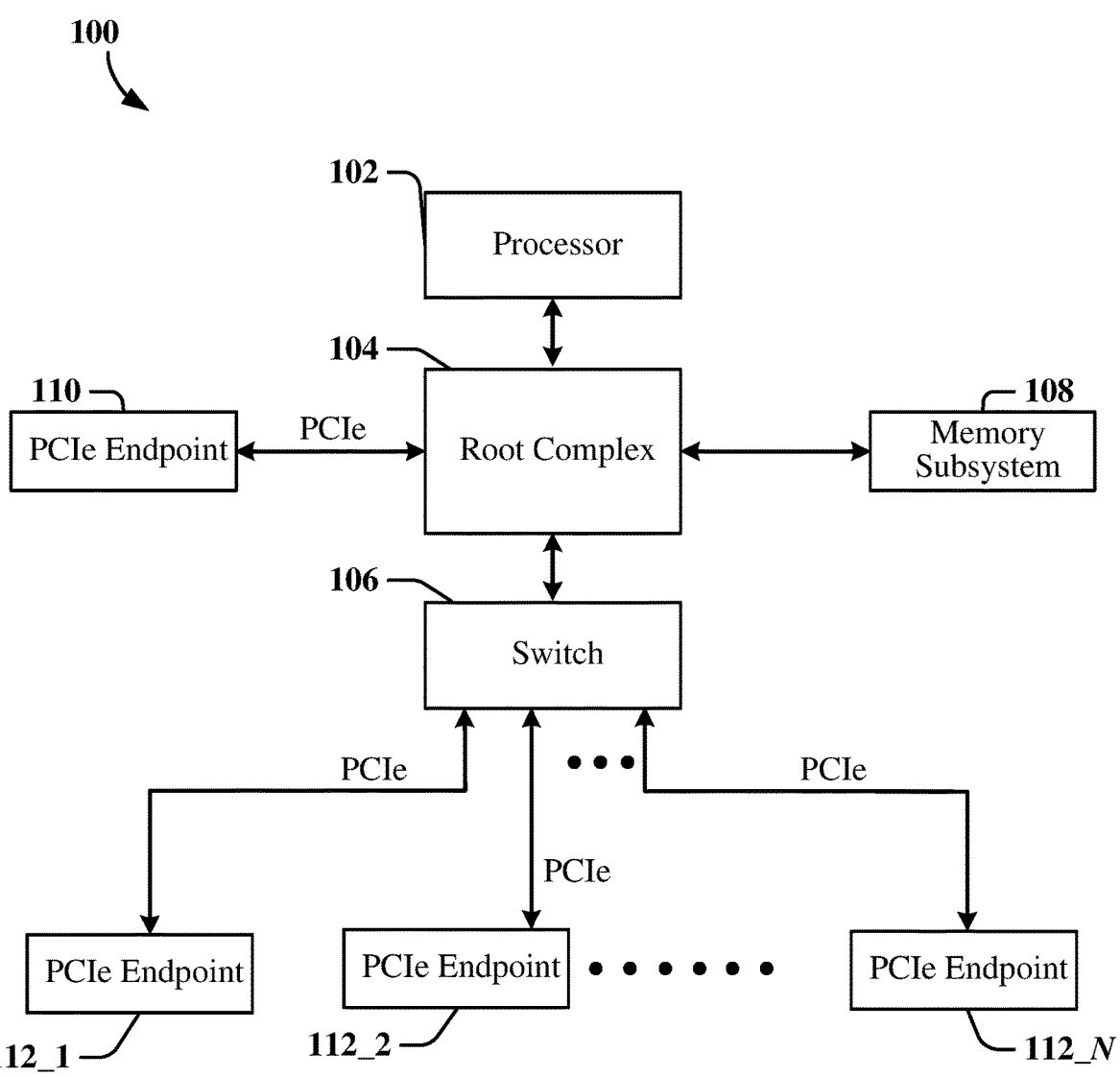
FIG. 1 is a block diagram of a computing architecture using PCIe interfaces according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, firmware, or any combination thereof. Whether such elements are implemented as hardware or software depends upon the particular application and design constraints imposed on the overall system.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component-based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for the implementation and practice of described examples. It is intended that innovations described herein may be practiced in a wide variety of devices, chip-level components, systems, distributed arrangements, end-user devices, etc., of varying sizes, shapes, and constitution.

In a PCIe system, a connection between any two PCIe devices (e.g., a root complex (RC) and an endpoint (EP)) is referred to as a PCIe link. A PCIe link is a point-to-point interconnect that supports both internal and external connectivity either across a cable assembly or at the printed circuit board (PCB) level. Connections may be made chip-to-chip with no connectors, through an expansion card interface with a board and a connector, or on a backplane with multiple boards and connectors. The RC is coupled to a processor (e.g., a central processing unit (CPU)) configured to perform power management for an apparatus (e.g., wireless communication device, tablet, personal computer, or other computing system).

Each EP may inform the processor via the RC of its tolerance of memory read/write latencies, allowing power management policies for central resources (e.g., central memory devices) to be implemented by the processor in accordance with the EP latency tolerances. The latency tolerances may include both snoop latency values and no-snoop latency values. No-snoop latency refers to the latency tolerance of an EP to read/write data to memory without snooping the processor caches, whereas snoop latency refers to the latency tolerance of an EP to read/write data to memory with processor cache snooping. Each EP may send, for example, a latency tolerance reporting (LTR) message when the latency tolerance for snoop and/or no-snoop of the EP changes (e.g., based on the traffic handled by the EP). However, each LTR message may interrupt the processor, preempting the processor from performing other power management procedures. With a potentially large number of LTR messages being sent from the EPs to the processor, the performance of the apparatus may be impacted.

Various aspects are related to mechanisms for aggregating LTR messages across EPs to identify a minimum snoop latency and a minimum no-snoop latency for transmission to the processor. In some examples, an LTR aggregator module within the RC may receive LTR messages from EPs, identify new snoop and/or no-snoop latencies from the LTR messages and compare the new snoop and/or no-snoop latencies to previously sent (e.g., stored) minimum snoop/no-snoop latencies. If the new snoop latency is less than the previously stored minimum snoop latency and/or the new no-snoop latency is less than the previously stored minimum no-snoop latency, the LTR aggregator module can update the minimum snoop latency and/or minimum no-snoop latency and send an LTR message to the processor with the updated minimum snoop latency and/or no-snoop latency. By updating the processor only when the minimum snoop and/or minimum no-snoop latency changes, the number of interrupts experienced by the processor is reduced, thus improving power management performance of the apparatus.

In some examples, the LTR aggregator module may further be configured to determine that a link-down event occurred for an EP associated with at least one of the minimum snoop latency or minimum no-snoop latency. In this example, the LTR aggregator module may further update the snoop and/or no-snoop latency to the next lowest (next minimum) snoop and/or no-snoop latency and send the updated minimum snoop and/or no-snoop latency to the processor. In some examples, upon a reset event, the LTR aggregator module may send an LTR message to the processor with the maximum snoop latency and the maximum no-snoop latency and update those values once new LTR messages (after the reset event) from EPs are received.

FIG. 1 is a block diagram of an example computing architecture of a computing device using PCIe interfaces according to some aspects. The computing architecture 100 operates using multiple high-speed PCIe interface serial links. A PCIe interface may be characterized as an apparatus including a point-to-point topology, where separate serial links connect each device to a host, which is referred to as a root complex 104 (RC). In the computing architecture 100, the root complex 104 couples a processor 102 (e.g., central processing unit (CPU)) to memory devices, e.g., the memory subsystem 108, and a PCIe switch fabric including one or more PCIe devices (e.g., PCIe switch circuit(s) 106 and PCIe endpoint devices (EPs)). In some instances, the PCIe switch circuit 106 includes cascaded switch devices. One or more PCIe endpoint devices 110 (EP) may be coupled directly to the root complex 104, while other PCIe endpoint devices 112-1, 112-2 . . . 112-N may be coupled to the root complex 104 through the PCIe switch circuit 106. The processor 102 may be referred to herein as an upstream device of the RC 104, whereas the memory subsystem 108, other EPs 110, and PCIe switches 106 may be referred to herein as downstream devices of the RC 104.

The root complex 104 may be coupled to the processor 102 using a proprietary local bus interface or a standards-defined local bus interface. The root complex 104 may control configuration and data transactions through the PCIe interfaces and may generate transaction requests for the processor 102. In some examples, the root complex 104 is implemented in the same Integrated Circuit (IC) device that includes the processor 102. The root complex 104 supports multiple PCIe ports (e.g., root ports (RPs), not specifically shown in FIG. 1).

The root complex 104 may control communication between the processor 102 and the memory subsystem 108 which is one example of an endpoint. The root complex 104 also controls communication between the processor 102 and other PCIe endpoint devices 110, 112_1, 112_2 . . . 112_N. The PCIe interface may support full-duplex communication between any two endpoints, with no inherent limitation on concurrent access across multiple endpoints. Data packets may carry information through any PCIe link. In a multi-lane PCIe link, packet data may be striped across multiple lanes. The number of lanes in the multi-lane link may be negotiated during device initialization and may be different for different endpoints.

Figure 2:
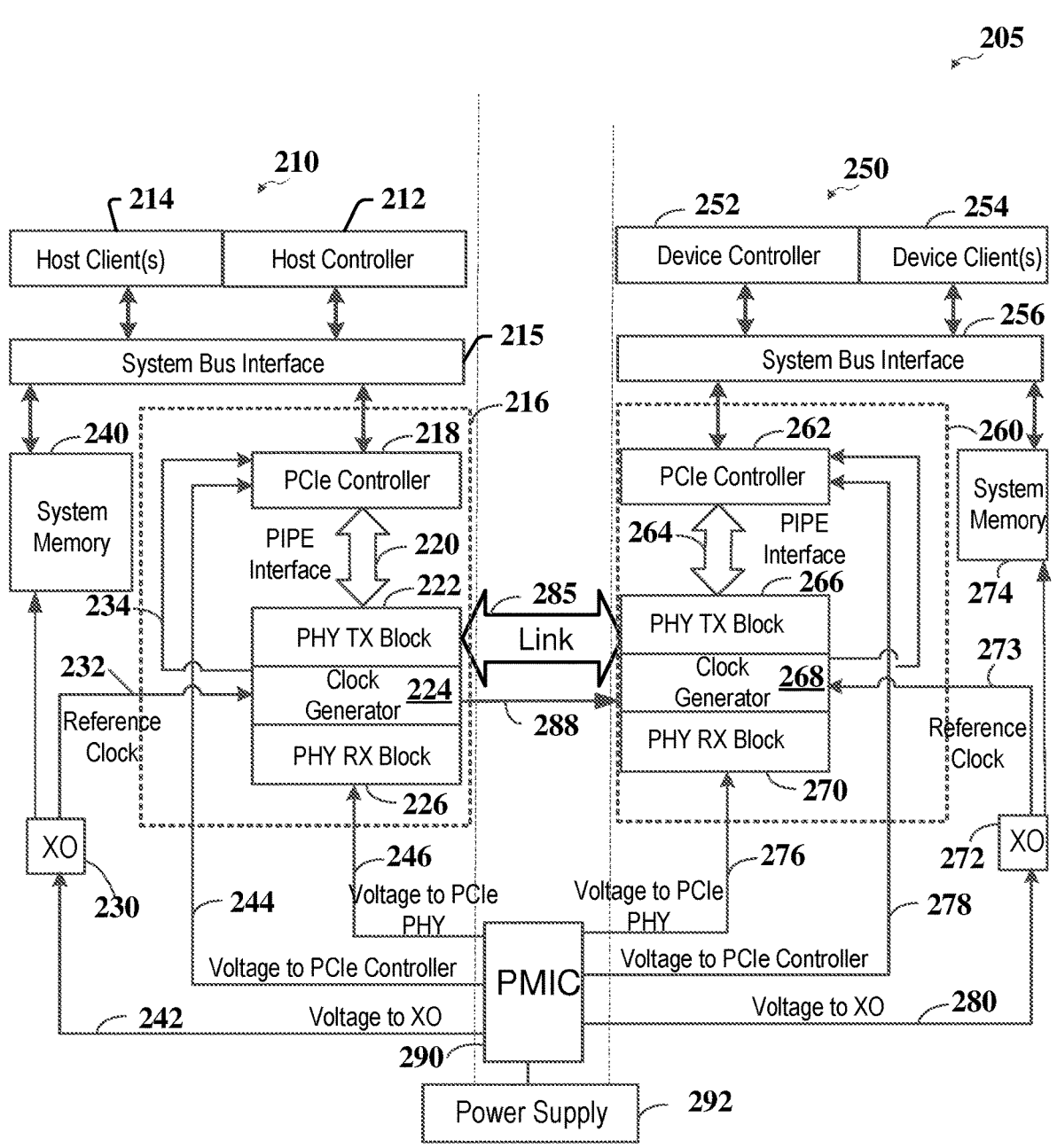
FIG. 2 is a block diagram of an exemplary PCIe system according to some aspects.

FIG. 2 is a block diagram of an exemplary PCIe system according to some aspects. The system 205 includes a host system 210 and an endpoint device system 250. The host system 210 may be integrated on a first chip (e.g., system on a chip or SoC), and the endpoint device system 250 may be integrated on a second chip. Alternatively, the host system, for example a RC, and/or endpoint device (EP) system may be integrated in first and second packages, e.g., SiP, first and second system boards with multiple chips, or in other hardware or any combination. In this example, the host system 210 and the endpoint device system 250 are coupled by a PCIe link 285.

The host system 210 includes one or more host clients 214. Each of the one or more host clients 214 may be implemented on a processor executing software that performs the functions of the host clients 214 discussed herein. For the example of more than one host client, the host clients may be implemented on the same processor or different processors. The host system 210 also includes a host controller 212, which may perform root complex functions. The host controller 212 may be implemented on a processor executing software that performs the functions of the host controller 212 discussed herein.

The host system 210 includes a PCIe interface circuit 216, a system bus interface 215, and a host system memory 240. The system bus interface 215 may interface the one or more host clients 214 with the host controller 212, and interface each of the one or more host clients 214 and the host controller 212 with the PCIe interface circuit 216 and the host system memory 240. The PCIe interface circuit 216 provides the host system 210 with an interface to the PCIe link 285. In this regard, the PCIe interface circuit 216 is configured to transmit data (e.g., from the host clients 214) to the endpoint device system 250 over the PCIe link 285 and receive data from the endpoint device system 250 via the PCIe link 285. The PCIe interface circuit 216 includes a PCIe controller 218, a physical interface for PCI Express (PIPE) interface 220, a physical (PHY) transmit (TX) block 222, a clock generator 224, and a PHY receive (RX) block 226. The PIPE interface 220 provides a parallel interface between the PCIe controller 218 and the PHY TX block 222 and the PHY RX block 226. The PCIe controller 218 (which may be implemented in hardware) may be configured to perform transaction layer, data link layer, and control flow functions specified in the PCIe specification, as discussed further below.

The host system 210 also includes an oscillator (e.g., crystal oscillator or "XO") 230 configured to generate a reference clock signal 232. The reference clock signal 232 may have a frequency of 19.2 MHz in one example, but is not limited to such frequency. The reference clock signal 232 is input to the clock generator 224 which generates multiple clock signals based on the reference clock signal 232. In this regard, the clock generator 224 may include a phase locked loop (PLL) or multiple PLLs, in which each PLL generates a respective one of the multiple clock signals by multiplying up the frequency of the reference clock signal 232.

The endpoint device system 250 includes one or more device clients 254. Each device client 254 may be implemented on a processor executing software that performs the functions of the device client 254 discussed herein. For the example of more than one device client 254, the device clients 254 may be implemented on the same processor or different processors. The endpoint device system 250 also includes a device controller 252. The device controller 252 may be configured to receive bandwidth request(s) from one or more device clients, and determine whether to change the number of active lanes or to change the link speed based on bandwidth requests. The device controller 252 may be implemented on a processor executing software that performs the functions of the device controller.

The endpoint device system 250 includes a PCIe interface circuit 260, a system bus interface 256, and endpoint system memory 274. The system bus interface 256 may interface the one or more device clients 254 with the device controller 252, and interface each of the one or more device clients 254 and device controllers 252 with the PCIe interface circuit 260 and the endpoint system memory 274. The PCIe interface circuit 260 provides the endpoint device system 250 with an interface to the PCIe link 285. In this regard, the PCIe interface circuit 260 is configured to transmit data (e.g., from the device client 254) to the host system 210 (also referred to as the host device) over the PCIe link 285 and receive data from the host system 210 via the PCIe link 285. The PCIe interface circuit 260 includes a PCIe controller 262, a PIPE interface 264, a PHY TX block 266, a PHY RX block 270, and a clock generator 268. The PIPE interface 264 provides a parallel interface between the PCIe controller 262 and the PHY TX block 266 and the PHY RX block 270. The PCIe controller 262 (which may be implemented in hardware) may be configured to perform transaction layer, data link layer and control flow functions.

The host system memory 240 and the endpoint system memory 274 at the endpoint may be configured to contain registers for the configuration and status of each lane of the PCIe link 285 and for the link itself. In an example, the host system memory 240 may include one or more latency tolerance registers configured to maintain latency tolerance data for each of the plurality of endpoints (e.g., endpoint device systems).

The endpoint device system 250 also includes an oscillator (e.g., crystal oscillator) 272 configured to generate a stable reference clock signal 273 for the endpoint system memory 274. In the example in FIG. 2, the clock generator 224 at the host system 210 is configured to generate a stable reference clock signal 273, which is forwarded to the endpoint device system 250 via a differential clock line 288 by the PHY RX block 226. At the endpoint device system 250, the PHY RX block 270 receives the EP reference clock signal on the differential clock line 288, and forwards the EP reference clock signal to the clock generator 268. The EP reference clock signal may have a frequency of 100 MHz, but is not limited to such frequency. The clock generator 268 is configured to generate multiple clock signals based on the EP reference clock signal from the differential clock line 288, as discussed further below. In this regard, the clock generator 268 may include multiple PLLs, in which each PLL generates a respective one of the multiple clock signals by multiplying up the frequency of the EP reference clock signal.

The system 205 also includes a power management integrated circuit (PMIC) 290 coupled to a power supply 292 e.g., mains voltage, a battery or other power source. The PMIC 290 is configured to convert the voltage of the power supply 292 into multiple supply voltages (e.g., using switch regulators, linear regulators, or any combination thereof). In this example, the PMIC 290 generates voltages 242 for the oscillator 230, voltages 244 for the PCIe controller 218, and voltages 246 for the PHY TX block 222, the PHY RX block 226, and the clock generator 224. The voltages 242, 244 and 246 may be programmable, in which the PMIC 290 is configured to set the voltage levels (corners) of the voltages 242, 244 and 246 according to instructions (e.g., from host controller 212).

The PMIC 290 also generates a voltage 280 for the oscillator 272, a voltage 278 for the PCIe controller 262, and a voltage 276 for the PHY TX block 266, the PHY RX block 270, and the clock generator 268. The voltages 280, 278 and 276 may be programmable, in which the PMIC 290 is configured to set the voltage levels (corners) of the voltages 280, 278 and 276 according to instructions (e.g., from the device controller 252). The PMIC 290 may be implemented on one or more chips. Although the PMIC 290 is shown as one PMIC in FIG. 2, it is to be appreciated that the PMIC 290 may be implemented by two or more PMICs. For example, the PMIC 290 may include a first PMIC for generating voltages 242, 244 and 246 and a second PMIC for generating voltages 280, 278 and 276. In this example, the first and second PMICs may both be coupled to the same power supply 292 or to different power supplies.

In operation, the PCIe interface circuit 216 on the host system 210 may transmit data from the one or more host clients 214 to the endpoint device system 250 via the PCIe link 285. The data from the one or more host clients 214 may be directed to the PCIe interface circuit 216 according to a PCIe map set up by the host controller 212 during initial configuration, sometimes referred to as Link Initialization, when the host controller negotiates bandwidth for the link. In examples, the host controller negotiates a first bandwidth for the transmit group of the link and negotiates a second bandwidth for the receive group of the link. At the PCIe interface circuit 216, the PCIe controller 218 may perform transaction layer and data link layer functions on the data e.g., packetizing the data, generating error correction codes to be transmitted with the data, etc.

The PCIe controller 218 outputs the processed data to the PHY TX block 222 via the PIPE interface 220. The processed data includes the data from the one or more host clients 214 as well as overhead data (e.g., packet header, error correction code, etc.). In one example, the clock generator 224 may generate a clock 234 for an appropriate data rate or transfer rate based on the reference clock signal 232, and input the clock 234 to the PCIe controller 218 to time operations of the PCIe controller 218. In this example, the PIPE interface 220 may include a 22-bit parallel bus that transfers 22-bits of data to the PHY TX block in parallel for each cycle of the clock 234. At 250 MHz this translates to a transfer rate of approximately 8 GT/s.

The PHY TX block 222 serializes the parallel data from the PCIe controller 218 and drives the PCIe link 285 with the serialized data. In this regard, the PHY TX block 222 may include one or more serializers and one or more drivers. The clock generator 224 may generate a high-frequency clock for the one or more serializers based on the reference clock signal 232.

At the endpoint device system 250, the PHY RX block 270 receives the serialized data via the PCIe link 285, and deserializes the received data into parallel data. In this regard, the PHY RX block 270 may include one or more receivers and one or more deserializers. The clock generator 268 may generate a high-frequency clock for the one or more deserializers based on the EP reference clock signal. The PHY RX block 270 transfers the deserialized data to the PCIe controller 262 via the PIPE interface 264. The PCIe controller 262 may recover the data from the one or more host clients 214 from the deserialized data and forward the recovered data to the one or more device clients 254.

On the endpoint device system 250, the PCIe interface circuit 260 may transmit data from the one or more device clients 254 to the host system memory 240 via the PCIe link 285. In this regard, the PCIe controller 262 at the PCIe interface circuit 260 may perform transaction layer and data link layer functions on the data e.g., packetizing the data, generating error correction codes to be transmitted with the data, etc. The PCIe controller 262 outputs the processed data to the PHY TX block 266 via the PIPE interface 264. The processed data includes the data from the one or more device clients 254 as well as overhead data (e.g., packet header, error correction code, etc.). In one example, the clock generator 268 may generates a clock based on the EP reference clock through a differential clock line 288, and inputs the clock to the PCIe controller 262 to time operations of the PCIe controller 262.

The PHY TX block 266 serializes the parallel data from the PCIe controller 262 and drives the PCIe link 285 with the serialized data. In this regard, the PHY TX block 266 may include one or more serializers and one or more drivers. The clock generator 268 may generate a high-frequency clock for the one or more serializers based on the EP reference clock signal.

At the host system 210, the PHY RX block 226 receives the serialized data via the PCIe link 285, and deserializes the received data into parallel data. In this regard, the PHY RX block 226 may include one or more receivers and one or more deserializers. The clock generator 224 may generate a high-frequency clock for the one or more deserializers based on the reference clock signal 232. The PHY RX block 226 transfers the deserialized data to the PCIe controller 218 via the PIPE interface 220. The PCIe controller 218 may recover the data from the one or more device clients 254 from the deserialized data and forward the recovered data to the one or more host clients 214.

The PMIC 290 supports energy-saving power management features that enables devices, such as the host system 210 or endpoint device system 250, to be put into states in which they draw less power (e.g., low-power states). Typically, a device is put into a low-power state when it is underutilized or inactive. The PMIC 290 may be in communication with a CPU (e.g., processor 102 shown in FIG. 1) to control the power states of the host system 210 and each of the endpoint device systems 250 (e.g., for each of the endpoints and/or switches). The processor 102 shown in FIG. 1 may be configured to perform power management at the highest system level (e.g., product/apparatus (e.g., mobile phone, tablet, etc.) level). For example, the processor 102 may be configured to tune the power management of the product/apparatus based on the actual device requirements and adjust the power usage verses performance.

PCIe devices (e.g., switches, EPs, and/or other downstream devices) may utilize power management messages, such as Latency Tolerance Reporting (LTR) messages to report device behaviors regarding the PCIe device tolerance of read/write service latencies to the host system (e.g., root complex). The host system can then forward the received LTR messages upstream to the processor 102. The LTR values are used by the processor 102 to implement an overall power management strategy that will extend the battery life of the product/apparatus, while providing optimal performance.

Figure 3:
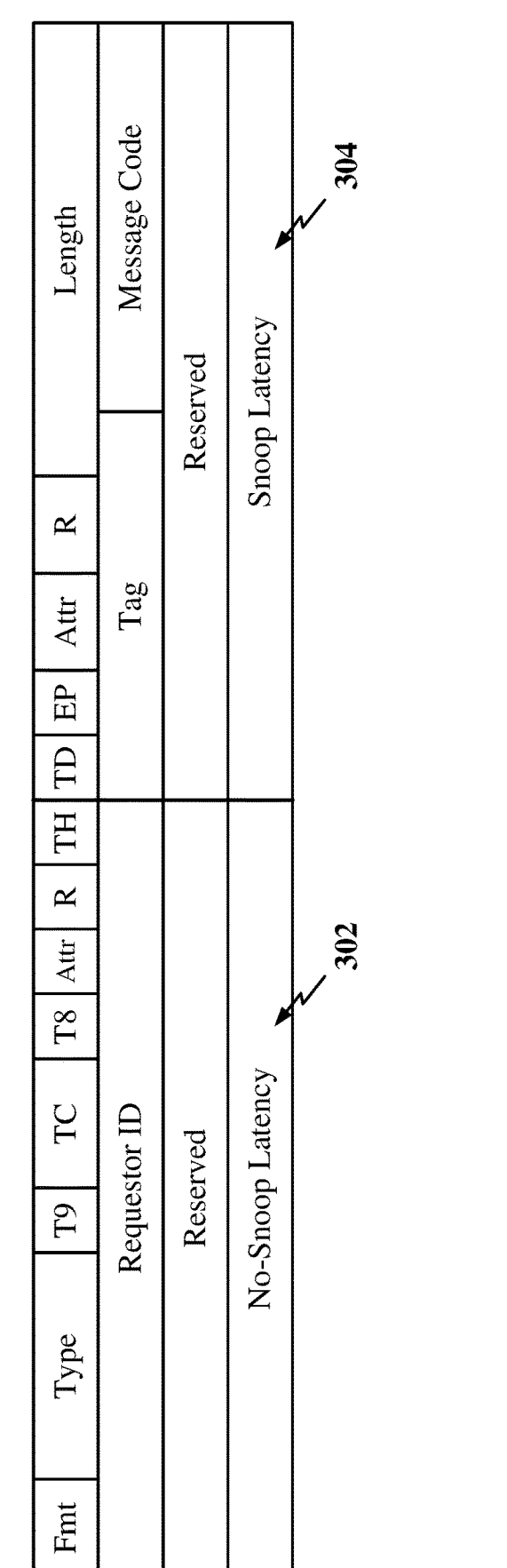
FIG. 3 is a diagram illustrating an example latency tolerance reporting (LTR) message according to some aspects.

FIG. 3 is a diagram illustrating an example LTR message 300 according to some aspects. The LTR message 300 includes, for example, a no-snoop latency field 302 and a snoop latency field 304. The LTR message 300 allows a device (e.g., PCIe EP or switch) to report its tolerance of memory read/write latencies, allowing power management policies for central resources (e.g., central memory devices) to be designed in accordance with the EP latency tolerances.

The no-snoop latency field 302 carries a no-snoop latency (e.g., a no-snoop latency value) that indicates the no-snoop latency requirement for the device (e.g., EP or switch). The no-snoop latency requirement may indicate, for example, the latency requirement for the device to access double data rate (DDR) synchronous dynamic random access memory (SDRAM) or other no-snoop resources on the apparatus (e.g., a wireless communication device or other product). For example, for a PCI no-snoop read operation, the read request may be sent directly to the SDRAM controller to obtain the data. The processor (CPU) caches do not need to be snooped and the PCIe device does not need to wait for a snoop response before using the data. Similarly, for a PCI no-snoop write operation, the write request may be sent directly to the SDRAM controller and the CPU caches do not need to be snooped to invalidate any copies of that cache line. No-snoop thus reduces the amount of time that the buffer handling the writes requests is occupied.

The no-snoop latency value may be used by power management software/firmware (e.g., running on the CPU/ processor 102, shown in FIG. 1) in establishing the power management policies of the SDRAM. In an example, if the deep power off state (sleep state) of SDRAM requires two milliseconds for the SDRAM to return to an active state, but the no-snoop latency tolerance of an EP is one millisecond to access SDRAM, the SDRAM may not be placed into the deep power off state as this state would violate the no-snoop latency of the EP (PCIe device).

The snoop latency field 304 carries a snoop latency (e.g., a snoop latency value) that indicates the snoop latency requirement for the device (e.g., EP or switch). The snoop latency requirement may indicate, for example, the latency requirement for the device to access CPU cache memory or other snoop resources on the apparatus. As an example, if the deep power off state (sleep state) of cache memory in the CPU requires several milliseconds for the cache memory to return to an active state, but the snoop latency of an EP indicates that the EP snoop latency tolerance is 100 microseconds to snoop in cache, the CPU cache may not be placed into the deep power off state as this state would violate the snoop latency of the EP.

In some examples, the LTR message 300 may include only a no-snoop value or only a snoop value. In other examples, the LTR message may include both a no-snoop value and a snoop value. For example, if the EP has some traffic that performs no-snoop read/write operations and other traffic that performs snoop read/write operations, the LTR message 300 may include both a no-snoop value and a snoop value.

Each of the no-snoop field 302 and the snoop field 304 may include, for example, ten bits, plus a three-bit multiplier field, allowing a range from 1 nanosecond to 32 milliseconds. Each of the fields 302 and 304 may further include a requirement bit to indicate whether this timing is required.

Figure 4:
FIG. 4 is a diagram illustrating another example computing architecture using PCIe interfaces according to some aspects.

FIG. 4 is a diagram illustrating another example computing architecture using PCIe interfaces according to some aspects. The computing architecture 400 includes a root complex 404 (RC) that couples a processor 402 (e.g., central processing unit (CPU)) to downstream devices, such as PCIe endpoints 410*a*, 410*b*, 410*c*, 410*d*, 410*c*, 410*f*, and 410*g* and PCIe switches 412*a*, 412*b*, and 412*c* via root ports (RPs) 406*a*, 406*b*, . . . , 406N (e.g., specific ports on, for examples, a motherboard). In some instances, a PCIe switch (e.g., PCI switch 412*b*) includes cascaded switch devices 412*b* and 412*c*. One or more PCIe endpoint devices (EPs), e.g., EP 410*a*, may be coupled directly to a RP 406*a* of the root complex 404, while other PCIe endpoint devices 410*b*, . . . 410*g* may be coupled to RPs 406*b* . . . 406N of the root complex 404 through the PCIe switches 412*a*, 412*b*, and 412*c*.

Each EP 410*a* . . . 410*g* may send an LTR message each time the service requirements of the traffic sent/received by the EP changes. However, the PCIe standard may limit the transmission of LTR messages such that there is at least 500 microseconds between consecutive LTR messages sent by the same EP. Depending on the topology of the computing architecture 400, there may be multiple RPs 406*a*, . . . , 406N in an RC 404, each capable of receiving multiple LTR messages from different EPs. These LTR messages may be translated by the RPs 406*a* . . . 406N into interrupts/ notifications that are handled by the CPU (e.g., processor 402) that is running power management software/firmware (PM SW/FW). For example, the power management CPU 402 may be a micro-controller that is single-threaded with an operating frequency of less than 1 GHZ. The PM SW/FW reads the snoop and no-snoop latency and accounts for the latencies in power management policies, as described above. For example, if the exit latency out of a DDR low-power state is greater than the snoop or no-snoop latency, the DDR may not enter that low-power state. Similarly, if the exit latency out of a CPU cache or last level cache (LLC) low-power state is greater than the snoop latency, the CPU cache/LLC cache may not enter that low-power state.

The switches 412*a*, 412*b*, and 412*c* may collect LTR messages from downstream EPs 410*b*, . . . , 410*g* and send corresponding conglomerated LTR messages upstream to the root complex (RC) 404 for forwarding to the processor 402. The conglomerated LTR messages may account for (e.g., subtract) the switch latency (e.g., latency of switch downstream ports or switch upstream ports) and EP latency to reduce the snoop/no-snoop values reported upstream. In addition, the RPs 406a . . . 406N and RC 404 may further account for any internal processing delays to the conglomerated LTR messages for forwarding to the processor 402.

The PM SW/FW may store the conglomerated LTR values (e.g., snoop/no-snoop latency values) of each of the EPs 410a . . . 410g within, for example, a register. Each time the processor 402 receives a new LTR message, the PM SW/FW may compare the new LTR value received in the LTR message with the stored LTR value and update the stored LTR value if the new LTR value is less than the stored LTR value. Based on the new LTR value, the PM SW/FW may then take power management and resource availability actions accordingly. The conglomerated LTR values should be updated anytime an LTR value is received that is less than the stored LTR value (current LTR requirement), anytime the requirement bit of the LTR message is cleared and the value must be adjusted if that EP determined the lowest value, anytime an EP that had an LTR requirement goes into a non-active (e.g., non-D0) state where it is recommended to clear its LTR requirement bit, or anytime a link (e.g., PCIe link) goes down and the attached EP determined the previous conglomerated LTR value.

If, for example, there are 8 EPs for a given RC 404, each sending an LTR update every 500 microseconds, on average, there would be an LTR update needed every 62.5 microseconds. The number of LTR updates scales with the number of EPs. For example, with 32 EPs, the LTR update average would be every 15.6 microseconds. Therefore, the PM SW/FW (e.g., CPU/processor 402) may be interrupted frequently to handle LTR messages. In addition, it may require a number of CPU cycles to handle each LTR message. Therefore, each LTR message interrupt may preempt the processor 402 from performing other power management tasks (e.g., dynamic voltage and frequency scaling (DVFS), thermal limits management, etc.), thereby impact the performance of the apparatus.

Therefore, in accordance with aspects of the disclosure, the RC 404 includes an LTR aggregator module 408 (e.g., an aggregator circuit), configured to aggregate LTR messages received from the plurality of downstream devices (EPs/switches) via RPs 406a . . . 406N. From the received LTR messages, the LTR aggregator module 408 can identify a minimum snoop latency and a minimum no-snoop latency and transmit the minimum snoop latency and minimum no-snoop latency to the processor 402 (e.g., CPU) running the PW SW/FW. For example, upon receiving a new LTR message from an EP/switch including a new snoop latency and/or a new no-snoop latency (e.g., conglomerated snoop/no-snoop latencies), the LTR aggregator module 408 can compare the new snoop/no-snoop latency included in the LTR message with a corresponding previous minimum snoop/no-snoop latency, and update the minimum snoop/no-snoop latency in response to the new snoop/no-snoop latency being less than the previous minimum snoop/no-snoop latency. Upon updating the minimum snoop/no-snoop latency, the LTR aggregator module 408 can send the updated minimum snoop/no-snoop latency to the processor 402 within an LTR message. The LTR aggregator module 408 may then store the updated minimum snoop/no-snoop value(s) within, for example, a register or other suitable memory device.

In some examples, the LTR aggregator module 408 may include multiple LTR aggregator modules, each receiving LTR messages from a respective set of EPs/RPs. In some examples, the processor 402 may include multiple processors, each configured to receive LTR messages from one or more LTR aggregator modules 408. For example, a first processor may be configured to receive LTR messages from a first set of one or more LTR aggregator modules and a second processor may be configured to receive LTR messages from a second set of LTR aggregator modules. In other examples, each processor may be configured to receive LTR messages from each of the one or more LTR aggregator modules.

Figure 5:
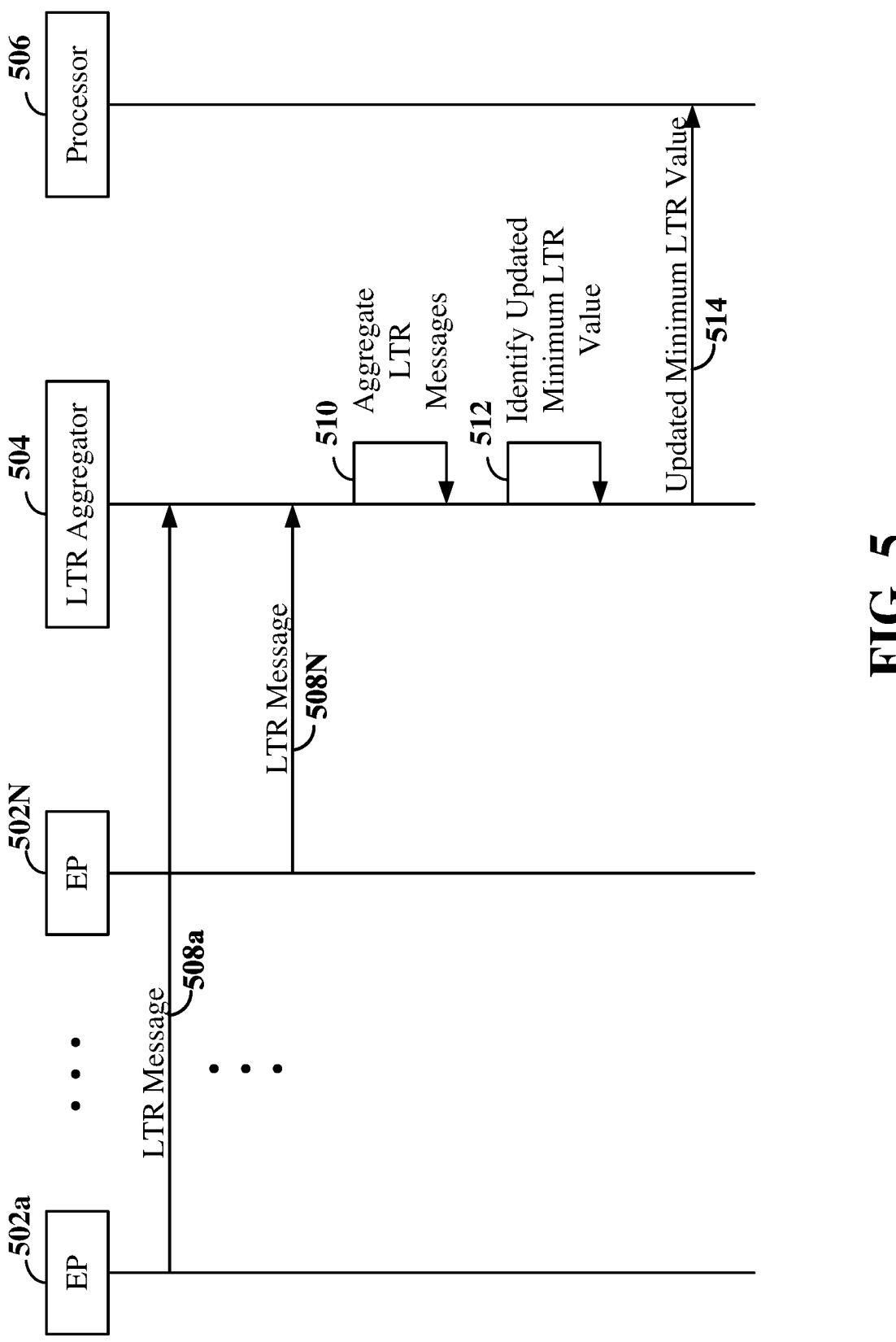
FIG. 5 is a signaling diagram illustrating exemplary signaling for aggregating LTR messages according to some aspects.

FIG. 5 is a signaling diagram illustrating exemplary signaling between a plurality of PCIe endpoint devices 502a . . . 502N, an LTR aggregator module 504, and a processor 506 for aggregating LTR messages according to some aspects. The LTR aggregator module 504 may correspond, for example, to the LTR aggregator module (e.g., aggregator circuit) 408 shown in FIG. 4 and may be implemented within a root complex (RC) of a computing architecture. The processor 506 may correspond, for example, to the processor 402 shown in FIG. 4 and may be configured for power management of an apparatus including the EPs 502a . . . 502N, LTR aggregator module 504, and processor 506. For example, the processor 506 may be configured to run power management software and/or firmware to design and implement power management policies for the apparatus.

At 508a . . . 508N, each of the plurality of EPs 502a . . . 502N may send a respective LTR message to the LTR aggregator module 504. Each LTR message may include a snoop latency value and/or a no-snoop latency value for the associated (respective) EP. At 510, the LTR aggregator module 504 may aggregate the LTR messages received from the EPs 502a . . . 502N, and at 512, identify an updated minimum LTR value (e.g., an updated minimum snoop latency value and/or an updated minimum no-snoop latency value) among the plurality of LTR messages. For example, the LTR aggregator module may compare each new LTR value (e.g., snoop or no-snoop) to a stored minimum LTR value (e.g., a minimum snoop or minimum no-snoop value previously sent to the processor 506).

If a new LTR value is less than the corresponding stored minimum LTR value (e.g., snoop or no-snoop), the LTR aggregator module 504 can update the minimum LTR value with the new LTR value, and at 514, transmit the updated minimum LTR value (e.g., updated minimum snoop or no-snoop value) to the processor 506. For example, the LTR aggregator module 504 may transmit an LTR message including the updated minimum LTR value. In some examples, both an updated minimum snoop value and an updated minimum no-snoop value may be identified by the LTR aggregator module 504. In this example, the LTR aggregator module 504 may send an LTR message including both an updated minimum snoop value and an updated minimum no-snoop value.

FIG. 6 is a diagram illustrating an example of a register 600 (or other memory device) maintaining LTR information according to some aspects. The register 600 may include, for example, a table 602 containing the LTR information. The register 600 may be populated, for example, by the LTR aggregator module shown in FIGS. 4 and/or 5 based on LTR values included in LTR messages received by the LTR aggregator module.

The LTR information may include, for example, root port identifiers 604, a latest snoop latency 606 per root port and a latest no-snoop latency 610 per root port. The latest snoop latency 606 and the latest no-snoop latency 610 may be stored for each root port 604 across each of the EPs associated with that root port 604. For example, if a root port (e.g., Root Port 1) has a single EP coupled thereto, the latest snoop latency value 606 and the latest no-snoop latency value 610 for Root Port 1 corresponds to the latest snoop/no-snoop latency 606/610 of that single EP. However, if a root port (e.g., Root Port 2) has a switch (or cascaded switches) coupled thereto, each coupled to one or more EPs, the latest snoop/no-snoop latency 606/610 corresponds to the latest minimum snoop/no-snoop latency values 606/610 among all of the EPs coupled to Root Port 2. In addition, it should be understood that the latest snoop/no-snoop latency values 606/610 may represent conglomerated snoop/no-snoop latency values that account for downstream and/or upstream switch/processing latencies to/from the corresponding EPs associated with the snoop/no-snoop latency values.

The LTR information included in the table 602 further includes a respective minimum snoop latency indicator 608 and a respective minimum no-snoop latency indicator 612 for each of the latest snoop/no-snoop latency values 606/610. For example, the minimum snoop latency indicator 608 and minimum no-snoop latency indicator 612 may each be populated with a bit indicating whether each snoop/no-snoop latency value 606/610 corresponds to the minimum snoop/no-snoop latency value for the LTR aggregator module (e.g., across all RPs/EPs associated with the LTR aggregator module). In the example shown in FIG. 6, the latest snoop latency 606 associated with Root Port 1 has the corresponding minimum snoop latency indicator 608 set to Y (e.g., bit set to one) to indicate that this snoop latency is the minimum snoop latency for the LTR aggregator module. In addition, the latest no-snoop latency 610 associated with Root Port 2 has the corresponding minimum no-snoop latency indicator 612 set to Y (e.g., bit set to one) to indicate that this no-snoop latency is the minimum no-snoop latency for the LTR aggregator module.

In addition, the register 600 may further store the minimum snoop latency value 614 (e.g., ltr_msg_val_sent_snoop) and the minimum no-snoop latency value 616 (e.g., ltr_msg_val_sent_no-snoop) sent to the processor based on the indicators 608/612. In some examples, the table 602 and minimum values 614/616 may be cleared (e.g., upon reset) and the minimum snoop latency value 614 and the minimum no-snoop latency value 616 may then be set to the maximum snoop/no-snoop values until LTR messages are received and those values 614 and 616 are updated based on the indicators 608/612 in the table 602. Thus, the values 614 and 616 are updated when an updated minimum snoop/no-snoop value is sent to the processor.

Figure 7:
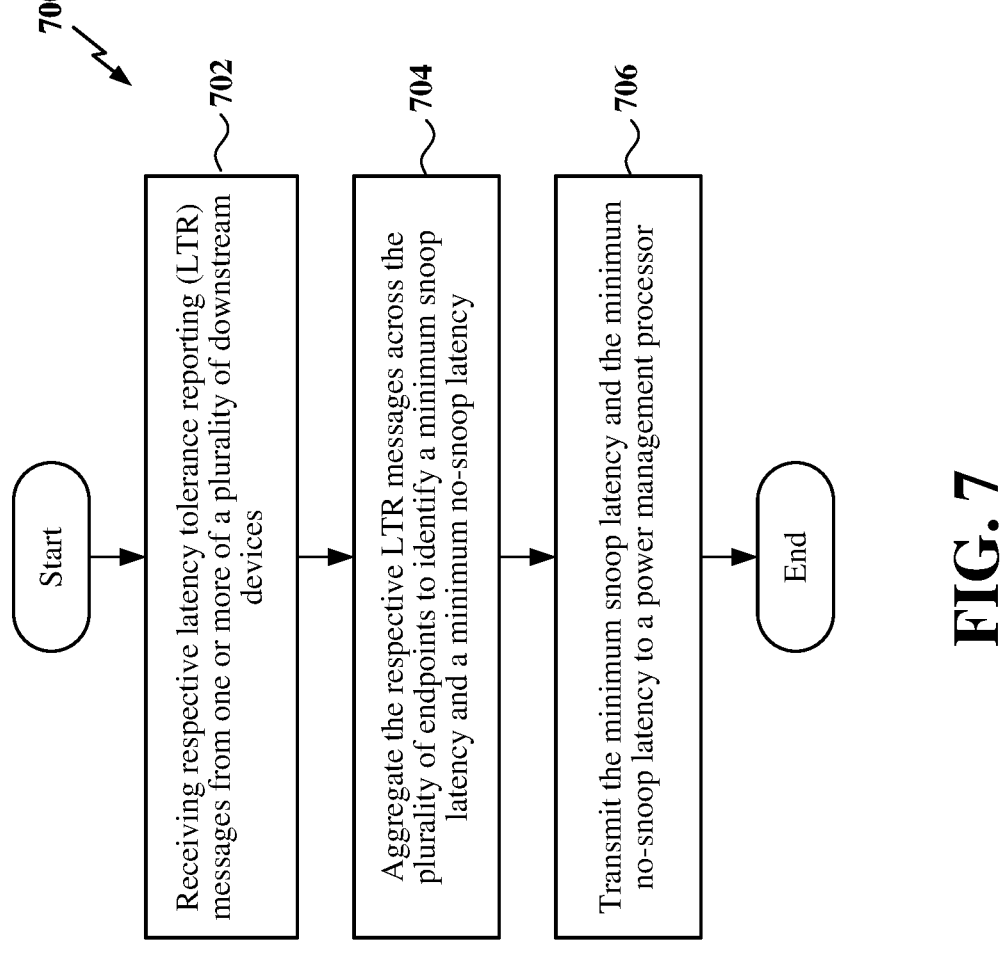
FIG. 7 is a flow chart illustrating an exemplary process for aggregating LTR messages according to some aspects.

FIG. 7 is a flow chart illustrating an exemplary process 700 for aggregating LTR messages according to some aspects. As described below, some or all illustrated features may be omitted in a particular implementation within the scope of the present disclosure, and some illustrated features may not be required for implementation of all embodiments. In some examples, the process 700 may be carried out by the LTR aggregator module (e.g., LTR circuit) 404 illustrated in FIG. 4, the LTR aggregator module 504 illustrated in FIG. 5, the LTR aggregator module 908 shown in FIG. 9, and/or the aggregator circuit 1106 shown in FIG. 11. In some examples, the process 700 may be carried out by any suitable apparatus or means for carrying out the functions or algorithm described below.

At block 702, the process begins with the LTR aggregator module (e.g., within the root complex) receiving respective latency tolerance reporting (LTR) messages from one or more of a plurality of endpoints. Each LTR message may include, for example, a snoop latency and/or a no-snoop latency.

At block 704, the LTR aggregator module may aggregate the respective LTR messages across the plurality of endpoints to identify a minimum snoop latency and a minimum no-snoop latency. For example, the minimum snoop latency may have a minimum snoop latency value from each of the received LTR messages. In addition, the minimum no-snoop latency may have a minimum no-snoop latency value from each of the received LTR messages. In addition, the LTR aggregator module may further store the minimum snoop latency and the minimum no-snoop latency within, for example, a register or other memory device. The LTR aggregator module may further store respective latest snoop latencies and respective latest no-snoop latencies for each of a plurality root ports coupled to the plurality of endpoints in the register, as shown in FIG. 6. In this example, the respective latest snoop latencies include the minimum snoop latency and the respective latest no-snoop latencies include the minimum no-snoop latency.

At block 706, the LTR aggregator module may transmit the minimum snoop latency and the minimum no-snoop latency to a processor configured for power management. For example, the minimum snoop latency and the minimum no-snoop latency may control power management actions of the power management processor. In some examples, the minimum snoop latency comprises a conglomerated snoop latency and the minimum no-snoop latency comprises a conglomerated no-snoop latency, wherein the conglomerated snoop latency and the conglomerated no-snoop latency each account for at least one of downstream latency to the plurality of end points or upstream latency to the processor.

Figure 8:
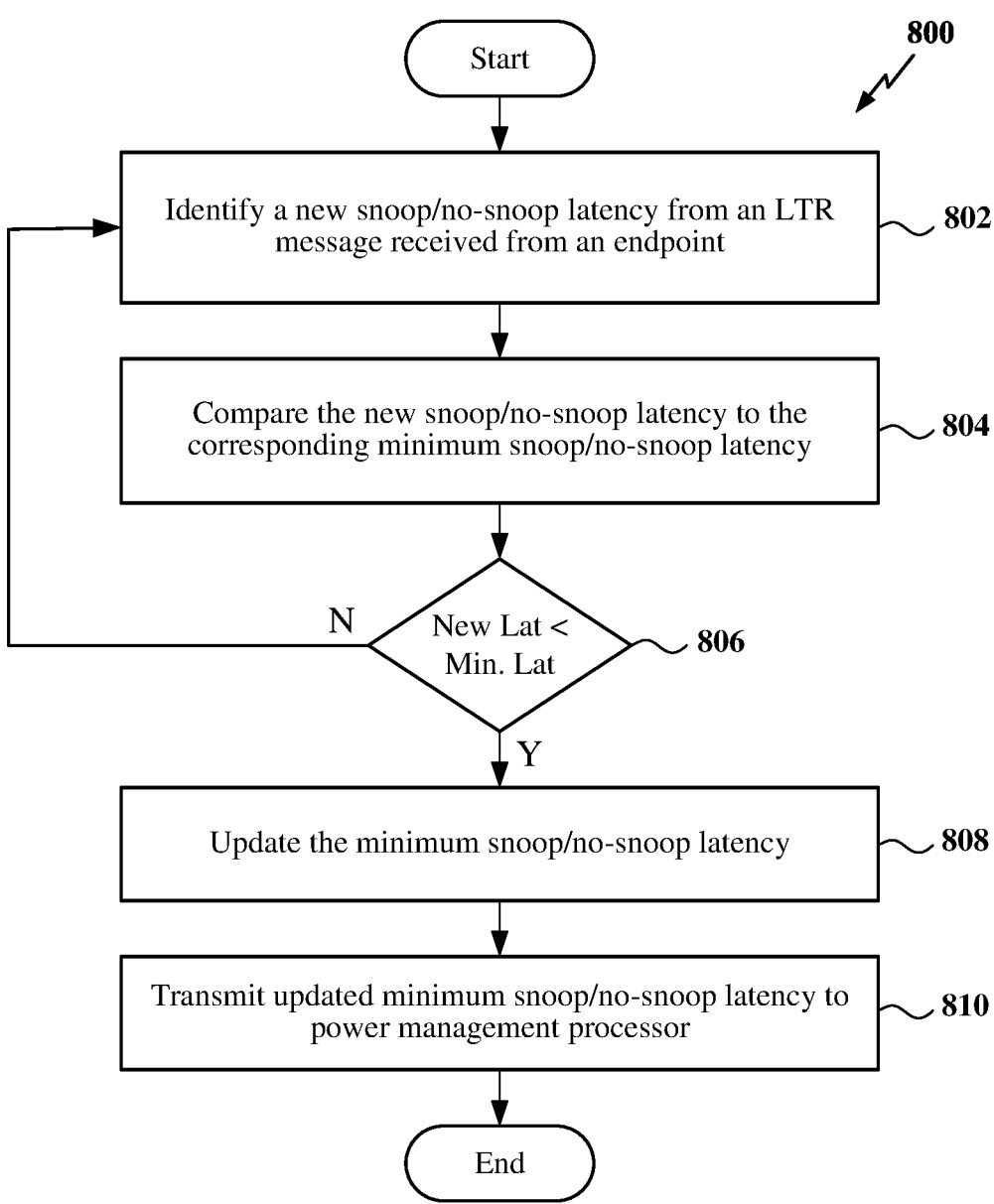
FIG. 8 is a flow chart illustrating another exemplary process for aggregating LTR messages according to some aspects.

FIG. 8 is a flow chart illustrating another exemplary process 800 for aggregating LTR messages according to some aspects. As described below, some or all illustrated features may be omitted in a particular implementation within the scope of the present disclosure, and some illustrated features may not be required for implementation of all embodiments. In some examples, the process 800 may be carried out by the LTR aggregator module (e.g., LTR circuit) 404 illustrated in FIG. 4, the LTR aggregator module 504 illustrated in FIG. 5, the LTR aggregator module 908 shown in FIG. 9, and/or the aggregator circuit 1106 shown in FIG. 11. In some examples, the process 800 may be carried out by any suitable apparatus or means for carrying out the functions or algorithm described below.

At block 802, the process begins with the LTR aggregator module (e.g., within the root complex) identifying a new snoop latency or a new no-snoop latency from LTR messages received from a plurality of endpoints. For example, the LTR aggregator module may receive an LTR message from an endpoint including the new snoop latency or the new non-snoop latency.

At block 804, the LTR aggregator module may compare the new snoop latency to the minimum snoop latency (e.g., ltr_msg_val_sent_snoop) or the new no-snoop latency to the minimum no-snoop latency (e.g., ltr_msg_val_sent_no-snoop). The minimum snoop/no-snoop latencies correspond to the immediately preceding values sent to the processor and stored, for example, in the register shown in FIG. 6.

At block 806, the LTR aggregator module may determine whether the new snoop/no-snoop latency is less than the corresponding minimum snoop/no-snoop latency. If the new snoop/no-snoop latency is less than the corresponding minimum snoop/no-snoop latency (Y branch of block 806), at block 808, the LTR aggregator module may update the minimum snoop/no-snoop latency to the new snoop/no-snoop latency. In addition, at block 810, the LTR aggregator module may transmit the updated minimum snoop/no-snoop latency to the processor (e.g., within an LTR message to the processor). For example, the LTR aggregator module may generate and transmit a new LTR message including the new/updated minimum snoop and/or no-snoop latency for the LTR aggregator module.

Figure 9:
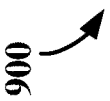
FIG. 9 is a diagram illustrating another example computing architecture using PCIe interfaces according to some aspects.

FIG. 9 is a diagram illustrating another example computing architecture of a computing device using PCIe interfaces according to some aspects. The computing architecture 900 includes a root complex 904 (RC) that couples a processor 902 (e.g., central processing unit (CPU)) to downstream devices, such as PCIe endpoints 910a, 910b, 910c, 910d, 910e, 910f, and 910g and PCIe switches 912a, 912b, and 912c via root ports (RPs) 906a, 906b, . . . , 906N (e.g., specific ports on, for examples, a motherboard). In some instances, a PCIe switch (e.g., PCI switch 912b) includes cascaded switch devices 912b and 912c. One or more PCIe endpoint devices (EPs), e.g., EP 910a, may be coupled directly to a RP 906a of the root complex 904, while other PCIe endpoint devices 910b, . . . 910g may be coupled to RPs 906b . . . 906N of the root complex 904 through the PCIe switches 912a, 912b, and 912c.

As in the example shown in FIG. 4, each EP 910a . . . 910g may send an LTR message each time the service requirements of the traffic sent/received by the EP changes. The LTR messages may be conglomerated by the switches 912a . . . 912c and/or RPs 906a . . . 906N to produce conglomerated LTR messages. In addition, as in the example shown in FIG. 4, the RC 904 includes an LTR aggregator module 908 (e.g., an aggregator circuit), configured to aggregate the conglomerated LTR messages received from the plurality of downstream devices (EPs/switches) via RPs 906a . . . 906N. From the received LTR messages, the LTR aggregator module 908 can identify a minimum snoop latency and a minimum no-snoop latency and transmit the minimum snoop latency and minimum no-snoop latency to the processor 902 (e.g., CPU) running the PW SW/FW. For example, the LTR aggregator module 908 may send an LTR message with an updated minimum snoop and/or no-snoop latency to the processor 902. In some examples, the LTR aggregator module 908 may send separate LTR messages for the snoop and no-snoop latencies.

If a link-down event for an EP occurs (e.g., a PCIe link to that EP goes down), the RP coupled to that EP may report the link-down event to the LTR aggregator module 908. In the example shown in FIG. 9, a link-down event occurred for the link between EP 910a and RP 906a. Upon determining that the link-down event occurred, the LTR aggregator module 908 can access the register to check whether the maximum snoop and/or no-snoop latency is associated with EP 910a. For example, the LTR aggregator module 908 may access the register 600 shown in FIG. 6 and determine that the minimum snoop latency indicator 608 is set to Y (yes) for RP 906a coupled to EP 906a. In this example, the LTR aggregator module 908 may identify a next minimum snoop latency from the respective latest snoop latencies 606 stored in the register 600 and update the minimum snoop latency value 614 to the next minimum snoop latency. For example, the next minimum snoop latency may correspond to the latest snoop latency 606 associated with Root Port 2 (e.g., RP 606b). In an example, the latest snoop latency 606 associated with RP 606b may be associated with EP 910b. In this example, the LTR aggregator module 908 may further update the minimum snoop latency indicator 608 associated with Root Port 2 (e.g., RP 606b) to Y (yes), and clear the row (e.g., latest snoop/no-snoop latencies and associated indicators) in the table 602 for Root Port 1 (e.g., RP 606a). The LTR aggregator module 908 may then further report the updated minimum snoop latency to the processor 902 running PM SW/FW (e.g., within a new LTR message).

Figure 10:
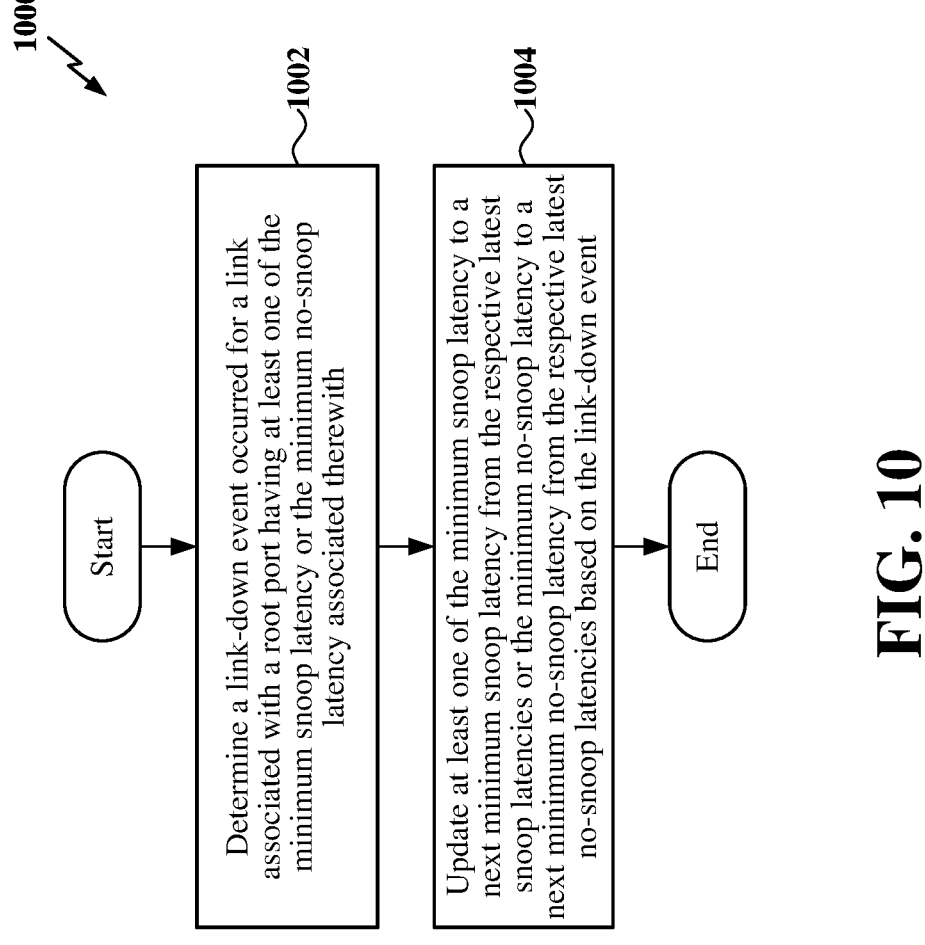
FIG. 10 is a flow chart illustrating another exemplary process for aggregating LTR messages according to some aspects.

FIG. 10 is a flow chart illustrating another exemplary process 1000 for aggregating LTR messages according to some aspects. As described below, some or all illustrated features may be omitted in a particular implementation within the scope of the present disclosure, and some illustrated features may not be required for implementation of all embodiments. In some examples, the process 1000 may be carried out by the LTR aggregator module (e.g., LTR circuit) 404 illustrated in FIG. 4, the LTR aggregator module 504 illustrated in FIG. 5, the LTR aggregator module 908 shown in FIG. 9, and/or the aggregator circuit 1106 shown in FIG. 11. In some examples, the process 1000 may be carried out by any suitable apparatus or means for carrying out the functions or algorithm described below.

At block 1002, the process begins with determining a link-down event occurred for a link associated with a root port having at least one of the minimum snoop latency or the minimum no-snoop latency associated therewith. For example, the root port may be coupled to an endpoint (EP) having the minimum snoop latency or the minimum no-snoop latency.

At block 1004, the LTR aggregator module may update at least one of the minimum snoop latency to a next minimum snoop latency from the respective latest snoop latencies or the minimum no-snoop latency to a next minimum no-snoop latency from the respective latest no-snoop latencies based on the link-down event. For example, if the root port reporting the link-down event is associated with the minimum snoop latency (e.g., an EP coupled to the root port has the minimum snoop latency across all EPs managed by the LTR aggregator module), the LTR aggregator module may access the table/register or other memory device to identify the next minimum snoop latency (next lowest snoop latency stored in the memory device) and update the minimum snoop latency to the next minimum snoop latency. The LTR aggregator module may then further report the updated minimum snoop latency to the processor running PM SW/FW (e.g., within a new LTR message).

Figure 11:
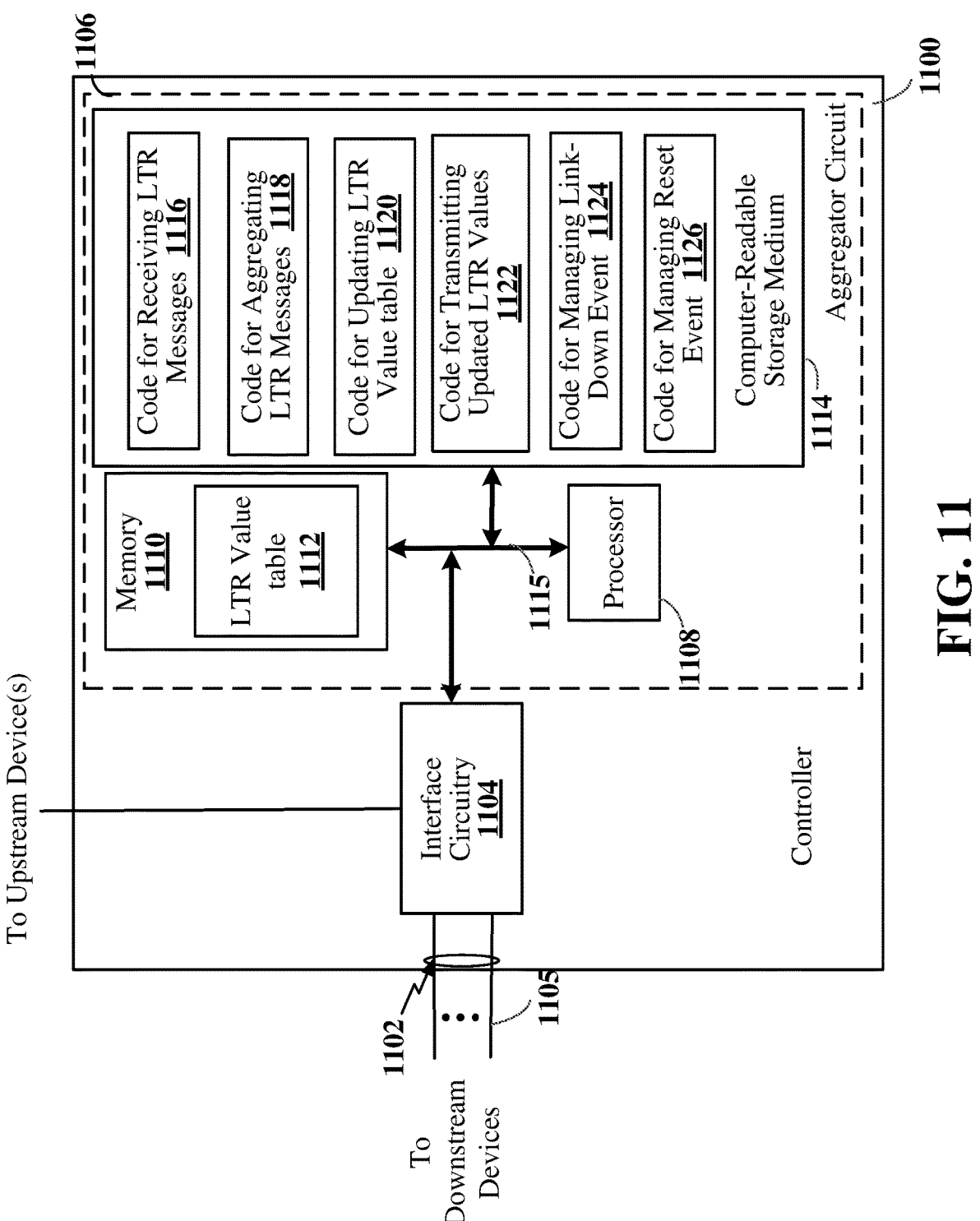
FIG. 11 is a diagram illustrating an example of a root complex (RC) controller according to some aspects.

FIG. 11 is a diagram illustrating an example of a root complex (RC) controller 1100 according to some aspects. The controller 1100 includes a plurality of root ports (RPs) 1102, each coupled to one or more downstream devices (switches/EPs) via respective PCIe links 1105. The RPs 1102 are further coupled to interface circuitry 1104 configured to manage the PCIe links 1105. In some examples, the interface circuitry 1104 may further be coupled to one or more upstream devices (e.g., a processor/CPU running power management firmware and/or software).

The interface circuitry 1104 is further coupled to an aggregator circuit 1106 configured to aggregate LTR messages received from downstream devices via the interface circuitry 1104 and to communicate updated minimum snoop/no-snoop latencies for the controller 1100 to upstream device(s) via the interface circuitry 1104. For example, the interface circuitry 1104 may communicate LTR messages received from downstream devices to the aggregator circuit 1106 via a bus 1115 and receive an LTR message including an updated minimum snoop and/or no-snoop latency from the aggregator circuit 1106 via bus 1115.

The bus 1115 communicatively couples together various circuits, including one or more processors (represented generally by the processor 1108), one or more memories (represented generally by the memory 1110), and one or more computer-readable media (represented generally by the computer-readable medium 1114). In some examples, the computer-readable media 1114 may be included within or part of one or more of the memories 1110. The bus 1115 may also link various other circuits (not shown). The memory 1110 may store, for example, an LTR value table 1112. In some examples, the LTR value table 1112 corresponds to the table 602 shown in FIG. 6.

The computer-readable medium 1114 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1114 may be embodied in a computer program product. By way of example, a computer program product may include a computer-readable medium in packaging materials.

The computer-readable medium 1114 may store computer-executable code (e.g., software). Software shall be construed broadly to mean instructions, instruction sets, code, code segments, program code, programs, subprograms, software modules, applications, software applications, software packages, routines, subroutines, objects, executables, threads of execution, procedures/processes, functions, etc., whether referred to as software, firmware, middleware, microcode, hardware description language, or otherwise. In the example shown in FIG. 11, the computer-readable medium 1114 may store code for receiving LTR messages 1116, code for aggregating LTR messages 1118, code for updating the LTR value table 1120, code for transmitting updated LTR values 1122, code for managing a link-down event 1124, and code for managing a reset event 1126.

One or more processors, such as processor 1108, may be responsible for managing the bus 1115 and general processing, including the execution of the software (e.g., instructions or computer-executable code) stored on the computer-readable medium 1114. The software, when executed by the processor 1108, causes the aggregator circuit 1106 to perform the various processes and functions described herein for any particular apparatus. The computer-readable medium 1114 and/or the memory 1110 may also be used for storing data that may be manipulated by the processor 1108 when executing software. For example, the memory 1110 may include one or more registers storing not only the LTR value table 1112, but may also store the current (updated) minimum LTR values (e.g., minimum snoop latency value and minimum no-snoop latency value), as shown in the example of FIG. 6.

The processor 1108 may be configured, for example, to execute the code for receiving LTR messages 1116 to receive and process each LTR message received at one of the RPs 1102. The processor 1108 may further be configured to execute the code for aggregating LTR messages 1118 to aggregate the LTR messages and identify a minimum snoop latency and a minimum no-snoop latencies from among the LTR messages. The processor 1108 may further be configured to execute the code for updating the LTR value table

1120 to update the LTR value table 1112 with the latest snoop/no-snoop latencies for each of the RPs 1102 (e.g., latest minimum per RP) and to update the minimum snoop and no-snoop latencies from the latest snoop/no-snoop latencies. The processor 1108 may further be configured to execute the code for transmitting updated LTR values 1122 to generate a new LTR message including the updated minimum snoop latency and/or updated minimum no-snoop latency for transmission to one or more upstream devices (e.g., one or more processors configured for power management).

In addition, the processor 1108 may be configured to execute the code for managing a link-down event 1124 to determine that a link-down event occurred for a RP 1102 associated with the minimum snoop latency and/or minimum no-snoop latency (e.g., using the LTR value table 1112) and to update the minimum snoop and/or no-latency as the next lowest (next minimum) snoop and/or no-snoop latency using the LTR value table 1112. The processor 1108 may further be configured to execute the code for managing a reset event 1126 to determine that a reset event for the apparatus including the RC controller 1100 occurred and to update the minimum snoop latency and minimum no-snoop latency to maximum values associated therewith (e.g., a maximum snoop latency and a maximum no-snoop latency) in response to the reset event. Upon updating the minimum snoop and/or no-snoop latency based on a link-down event or a reset event occurring, the processor 1108 may further be configured to execute the code for transmitting updated LTR values 1122 to generate and transmit the updated minimum snoop and/or no-snoop latencies to the one or more upstream devices.

Figure 12:
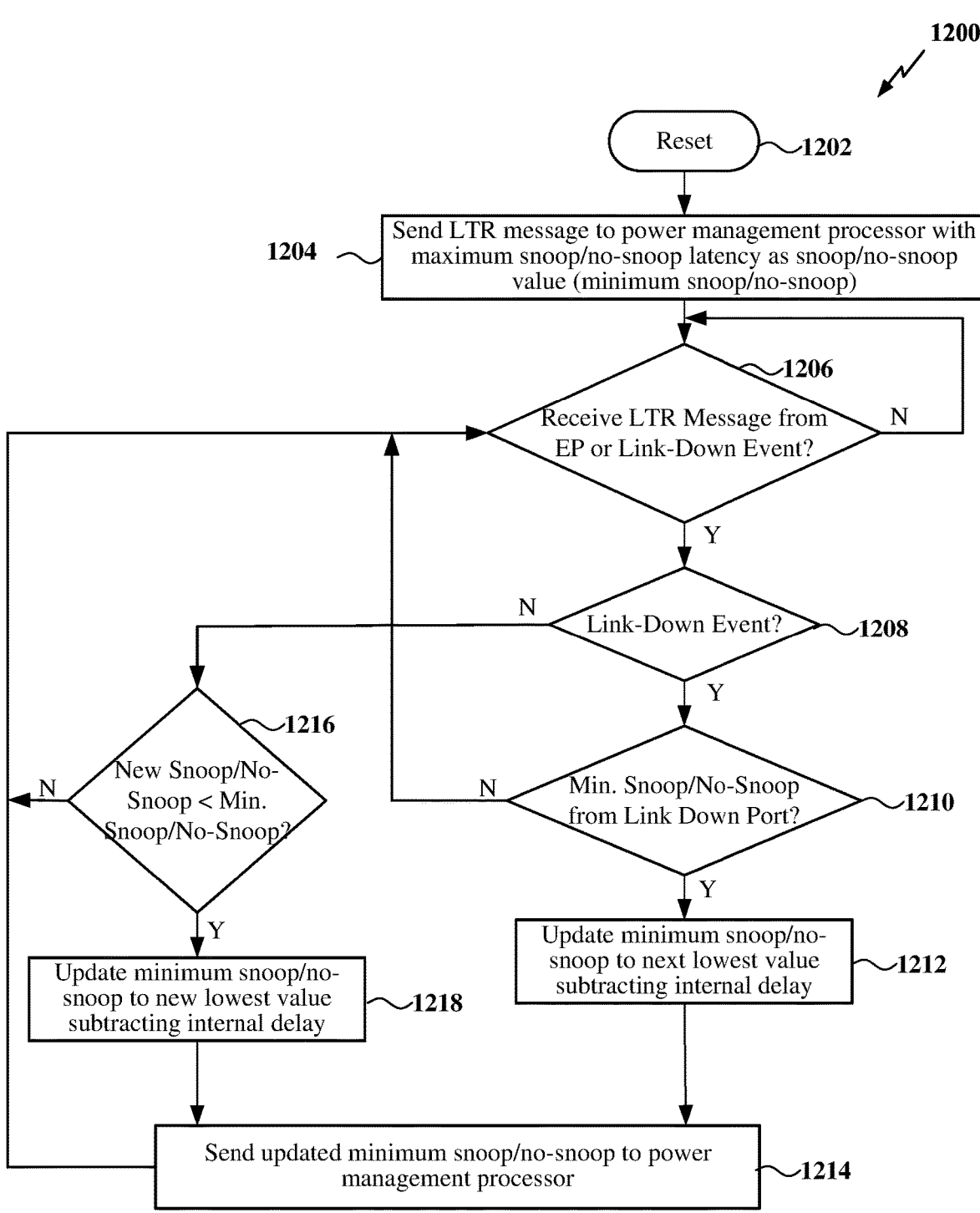
FIG. 12 is a flow chart illustrating another exemplary process for aggregating LTR messages according to some aspects.

FIG. 12 is a flow chart illustrating another exemplary process 1200 for aggregating LTR messages according to some aspects. As described below, some or all illustrated features may be omitted in a particular implementation within the scope of the present disclosure, and some illustrated features may not be required for implementation of all embodiments. In some examples, the process 1200 may be carried out by the LTR aggregator module (e.g., LTR circuit) 404 illustrated in FIG. 4, the LTR aggregator module 504 illustrated in FIG. 5, the LTR aggregator module 908 shown in FIG. 9, and/or the aggregator circuit 1106 shown in FIG. 11. In some examples, the process 1200 may be carried out by any suitable apparatus or means for carrying out the functions or algorithm described below.

At block 1202, the process begins with a reset event to reset an apparatus including a PCIe topology (e.g., a PCIe root complex including the LTR aggregator module and a plurality of PCIe downstream devices, such as switches and endpoints). At block 1204, upon detecting the reset event, an LTR aggregator module within the root complex may sent an LTR message to a power management processor (e.g., a processor configured for power management of the apparatus) with the maximum snoop/no-snoop latency as the LTR snoop/no-snoop values (e.g., the minimum snoop/no-snoop values for the root complex).

At block 1206, the LTR aggregator module may determine whether a new LTR message has been received from an endpoint (EP) or a link-down event associated with a root port (RP)/EP occurred. At block 1208, if the LTR aggregator module determines that a link-down event occurred, at block 1210, the LTR aggregator module may determine whether the current minimum snoop and/or no snoop latency is from the link-down port (RP). If so, at block 1212, the LTR aggregator module may update the minimum snoop and/or no-snoop latency to the next lowest value subtracting any internal delays (e.g., the conglomerated LTR value). At block 1214, the LTR aggregator module may then send the updated minimum snoop and/or snoop latency to the power management processor.

At block 1208, if the LTR aggregator module determines that a new LTR message has been received from EP, at block 1210, the LTR aggregator module determines whether the new snoop and/or no-snoop latency included in the new LTR message is less than the minimum snoop and/or no-snoop latency currently stored in the register for the LTR aggregator module. If the new snoop and/or no-snoop latency is less than the minimum snoop and/or no-snoop latency, at block 1218, the LTR aggregator module updates the minimum snoop and/or no-snoop latency to the next lowest value subtracting any internal delays (e.g., the conglomerated LTR value). At block 1214, the LTR aggregator module may then send the updated minimum snoop and/or snoop latency to the power management processor. The LTR aggregator module then continues to aggregate new LTR messages and/or process link-down events at block 1206.

In one configuration, the apparatus includes means for receiving respective latency tolerance reporting (LTR) messages from one or more of a plurality of endpoints, means for aggregating the respective LTR messages across the plurality of endpoints to identify a minimum snoop latency and a minimum no-snoop latency, and means for transmitting the minimum snoop latency and the minimum no-snoop latency to a processor configured for power management. In one aspect, the aforementioned means may be the LTR aggregator module (e.g., aggregator circuit) shown in FIGS. 4, 5, 9, and/or 11 configured to perform the functions recited by the aforementioned means. In another aspect, the aforementioned means may be a circuit or any apparatus configured to perform the functions recited by the aforementioned means.

Of course, in the above examples, the circuitry included in the LTR aggregator module (e.g., aggregator circuit) is merely provided as an example, and other means for carrying out the described functions may be included within various aspects of the present disclosure, including any other suitable apparatus or means described in any one of the FIGS. 1, 2, 4, 5, 9, and/or 11, and utilizing, for example, the processes and/or algorithms described herein in relation to FIGS. 5, 7, 8, 10, and/or 12.

The following provides an overview of aspects of the present disclosure:

Aspect 1: A method of power management message aggregation, the method comprising: receiving respective latency tolerance reporting (LTR) messages from one or more of a plurality of endpoints; aggregating the respective LTR messages across the plurality of endpoints to identify a minimum snoop latency and a minimum no-snoop latency; and transmitting the minimum snoop latency and the minimum no-snoop latency to a processor configured for power management.

Aspect 2: The method of aspect 1, further comprising: identifying a new snoop latency from the respective LTR messages; comparing the new snoop latency to the minimum snoop latency; and updating the minimum snoop latency in response to the new snoop latency being less than the minimum snoop latency.

Aspect 3: The method of claim aspect 2, further comprising: identifying a new no-snoop latency from the respective LTR messages; comparing the new no-snoop latency to the minimum no-snoop latency; and updating the minimum no-snoop latency in response to the new no-snoop latency being less than the minimum no-snoop latency.

Aspect 4: The method of aspect 3, further comprising: storing the minimum snoop latency and the minimum no-snoop latency in a register.

Aspect 5: The method of aspect 4, further comprising: storing respective latest snoop latencies and respective latest no-snoop latencies for each of a plurality root ports coupled to the plurality of endpoints in the register, wherein the respective latest snoop latencies comprise the minimum snoop latency and the respective latest no-snoop latencies comprise the minimum no-snoop latency.

Aspect 6: The method of aspect 5, further comprising: determining a link-down event occurred for a link associated with a root port of the plurality of root ports, the root port having at least one of the minimum snoop latency or the minimum no-snoop latency associated therewith; and updating at least one of the minimum snoop latency to a next minimum snoop latency from the respective latest snoop latencies or the minimum no-snoop latency to a next minimum no-snoop latency from the respective latest no-snoop latencies based on the link-down event.

Aspect 7: The method of any of aspects 1 through 6, wherein the minimum snoop latency comprises a conglomerated snoop latency and the minimum no-snoop latency comprises a conglomerated no-snoop latency, wherein the conglomerated snoop latency and the conglomerated no-snoop latency each account for at least one of downstream latency to the plurality of endpoints or upstream latency to the processor.

Aspect 8: The method of any of aspects 1 through 7, further comprising: identifying a reset event; and transmitting a maximum snoop latency and a maximum no-snoop latency in response to the reset event.

Aspect 9: The method of any of aspects 1 through 8, wherein the minimum snoop latency and the minimum no-snoop latency control power management actions of the processor.

Aspect 10: An apparatus comprising: a controller coupled to a plurality of endpoints; and an aggregator circuit within the controller, the aggregator circuit configured to perform a method of any one of aspects 1 through 9.

Aspect 11: An apparatus comprising means for performing a method of any of aspects 1 through 9.

Aspect 12: A computing device, comprising: a processor configured for power management; and a controller coupled to a plurality of endpoints, the controller configured to perform a method of any of aspects 1 through 9.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-12 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4, 5, 9, and/or 11 may be configured to perform one or more of the methods, features, or steps described herein. The novel algorithms described herein may also be efficiently implemented in software and/or embedded in hardware.

Any reference to an element herein using a designation e.g., "first," "second," and so forth does not generally limit the quantity or order of those elements. Rather, these designations are used herein as a convenient way of distinguishing between two or more elements or instances of an element. Thus, a reference to first and second elements does not mean that only two elements can be employed, or that the first element must precede the second element.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. An apparatus, comprising:
a root complex comprising a controller coupled to a processor via an upstream connection and to a plurality of endpoints via respective downstream connections; and
an aggregator circuit within the controller, the aggregator circuit configured to:

receive respective latency tolerance reporting (LTR) messages from one or more of the plurality of endpoints;
aggregate the respective LTR messages across the plurality of endpoints to identify a minimum snoop latency and a minimum no-snoop latency;
store respective latest snoop latencies and respective latest no-snoop latencies for each of a plurality root ports coupled to the plurality of endpoints in a register, wherein the respective latest snoop latencies comprise the minimum snoop latency and the respective latest no-snoop latencies comprise the minimum no-snoop latency;
determine a link-down event occurred for a link associated with a root port of the plurality of root ports, the root port having at least one of the minimum snoop latency or the minimum no-snoop latency associated therewith;
update at least one of the minimum snoop latency to a next minimum snoop latency from the respective latest snoop latencies or the minimum no-snoop latency to a next minimum no-snoop latency from the respective latest no-snoop latencies based on the link-down event; and
transmit the minimum snoop latency and the minimum no-snoop latency to the processor configured for power management.

2. The apparatus of claim 1, wherein the aggregator circuit is further configured to:
identify a new snoop latency from the respective LTR messages;
compare the new snoop latency to a previously stored minimum snoop latency; and
update the minimum snoop latency in response to the new snoop latency being less than the previously stored minimum snoop latency.

3. The apparatus of claim 2, wherein the aggregator circuit is further configured to:
identify a new no-snoop latency from the respective LTR messages;
compare the new no-snoop latency to a previously stored minimum no-snoop latency; and
update the minimum no-snoop latency in response to the new no-snoop latency being less than the previously stored minimum no-snoop latency.

4. The apparatus of claim 1, wherein the minimum snoop latency comprises a conglomerated snoop latency and the minimum no-snoop latency comprises a conglomerated no-snoop latency, wherein the conglomerated snoop latency and the conglomerated no-snoop latency each account for at least one of downstream latency to the plurality of endpoints or upstream latency to the processor.

5. The method of claim 1, further comprising:
identifying a reset event; and
transmitting a maximum snoop latency and a maximum no-snoop latency in response to the reset event.

6. The method of claim 1, wherein the minimum snoop latency and the minimum no-snoop latency control power management actions of the processor.

7. A method of power management message aggregation, the method comprising:
receiving, at a controller of a root complex, respective latency tolerance reporting (LTR) messages from one or more of a plurality of endpoints coupled to the controller via respective downstream connections;

aggregating the respective LTR messages across the plurality of endpoints to identify a minimum snoop latency and a minimum no-snoop latency;

storing respective latest snoop latencies and respective latest no-snoop latencies for each of a plurality root ports coupled to the plurality of endpoints in a register, wherein the respective latest snoop latencies comprise the minimum snoop latency and the respective latest no-snoop latencies comprise the minimum no-snoop latency;

determining a link-down event occurred for a link associated with a root port of the plurality of root ports, the root port having at least one of the minimum snoop latency or the minimum no-snoop latency associated therewith;

updating at least one of the minimum snoop latency to a next minimum snoop latency from the respective latest snoop latencies or the minimum no-snoop latency to a next minimum no-snoop latency from the respective latest no-snoop latencies based on the link-down event; and transmitting the minimum snoop latency and the minimum no-snoop latency to a processor configured for power management, wherein the processor is coupled to the controller via an upstream connection.

8. The method of claim 7, further comprising:

identifying a new snoop latency from the respective LTR messages;

comparing the new snoop latency to a previously stored minimum snoop latency; and updating the minimum snoop latency in response to the new snoop latency being less than the previously stored minimum snoop latency.

9. The method of claim 8, further comprising:

identifying a new no-snoop latency from the respective LTR messages;

comparing the new no-snoop latency to a previously stored minimum no-snoop latency; and updating the minimum no-snoop latency in response to the new no-snoop latency being less than the previously stored minimum no-snoop latency.

10. The method of claim 7, wherein the minimum snoop latency comprises a conglomerated snoop latency and the minimum no-snoop latency comprises a conglomerated no-snoop latency, wherein the conglomerated snoop latency and the conglomerated no-snoop latency each account for at least one of downstream latency to the plurality of endpoints or upstream latency to the processor.

11. The method of claim 7, further comprising:

identifying a reset event; and transmitting a maximum snoop latency and a maximum no-snoop latency in response to the reset event.

12. The method of claim 7, wherein the minimum snoop latency and the minimum no-snoop latency control power management actions of the processor.

13. An apparatus at a root complex, comprising:

means for receiving respective latency tolerance reporting (LTR) messages from one or more of a plurality of endpoints coupled to the root complex via respective downstream connections;

means for aggregating the respective LTR messages across the plurality of endpoints to identify a minimum snoop latency and a minimum no-snoop latency;

means for storing respective latest snoop latencies and respective latest no-snoop latencies for each of a plurality root ports coupled to the plurality of endpoints in a register, wherein the respective latest snoop latencies comprise the minimum snoop latency and the respective latest no-snoop latencies comprise the minimum no-snoop latency;

means for determining a link-down event occurred for a link associated with a root port of the plurality of root ports, the root port having at least one of the minimum snoop latency or the minimum no-snoop latency associated therewith;

means for updating at least one of the minimum snoop latency to a next minimum snoop latency from the respective latest snoop latencies or the minimum no-snoop latency to a next minimum no-snoop latency from the respective latest no-snoop latencies based on the link-down event; and means for transmitting the minimum snoop latency and the minimum no-snoop latency to a processor configured for power management via an upstream connection.

14. The apparatus of claim 13, further comprising:

means for identifying a new snoop latency from the respective LTR messages;

means for comparing the new snoop latency to a previously stored minimum snoop latency; and means for updating the minimum snoop latency in response to the new snoop latency being less than the previously stored minimum snoop latency.

15. The apparatus of claim 14, further comprising:

means for identifying a new no-snoop latency from the respective LTR messages;

means for comparing the new no-snoop latency to a previously stored minimum no-snoop latency; and means for updating the minimum no-snoop latency in response to the new no-snoop latency being less than the previously stored minimum no-snoop latency.

16. The apparatus of claim 13, wherein the minimum snoop latency comprises a conglomerated snoop latency and the minimum no-snoop latency comprises a conglomerated no-snoop latency, wherein the conglomerated snoop latency and the conglomerated no-snoop latency each account for at least one of downstream latency to the plurality of endpoints or upstream latency to the processor.

17. The apparatus of claim 13, further comprising:

means for identifying a reset event; and means for transmitting a maximum snoop latency and a maximum no-snoop latency in response to the reset event.

18. The apparatus of claim 13, wherein the minimum snoop latency and the minimum no-snoop latency control power management actions of the processor.

19. A computing device, comprising:

a processor configured for power management; and a root complex comprising a controller coupled to a plurality of endpoints via respective downstream connections and to the processor via an upstream connection, the controller configured to:

receive respective latency tolerance reporting (LTR) messages from one or more of the plurality of endpoints;

aggregate the respective LTR messages across the plurality of endpoints to identify a minimum snoop latency and a minimum no-snoop latency;

store respective latest snoop latencies and respective latest no-snoop latencies for each of a plurality root ports coupled to the plurality of endpoints in a register, wherein the respective latest snoop latencies comprise the minimum snoop latency and the respective latest no-snoop latencies comprise the minimum no-snoop latency;

determine a link-down event occurred for a link associated with a root port of the plurality of root ports, the root port having at least one of the minimum snoop latency or the minimum no-snoop latency associated therewith;

update at least one of the minimum snoop latency to a next minimum snoop latency from the respective latest snoop latencies or the minimum no-snoop latency to a next minimum no-snoop latency from the respective latest no-snoop latencies based on the link-down event; and transmit the minimum snoop latency and the minimum no-snoop latency to the processor.

20. The computing device of claim 19, wherein the controller is further configured to:

identify a new snoop latency from the respective LTR messages;

compare the new snoop latency to a previously stored minimum snoop latency; and update the minimum snoop latency in response to the new snoop latency being less than the previously stored minimum snoop latency.

21. The apparatus of claim 20, wherein the controller is further configured to:

identify a new no-snoop latency from the respective LTR messages;

compare the new no-snoop latency to a previously stored minimum no-snoop latency; and update the minimum no-snoop latency in response to the new no-snoop latency being less than the previously stored minimum no-snoop latency.

* * * * *